(12) United States Patent
Li

(10) Patent No.: US 11,911,942 B2
(45) Date of Patent: Feb. 27, 2024

(54) INJECTION MOLD CAPABLE OF PLANNING AND CUTTING GATES IN INSIDE THEREOF AND PLANNING AND CUTTING METHOD

(71) Applicant: Zhuji Bihan Jinggong Mould Plastic Co., Ltd., Shaoxing (CN)

(72) Inventor: Zhaohui Li, Shaoxing (CN)

(73) Assignee: Zhuji Bihan Jinggong Mould Plastic Co., Ltd., Shaoxing (CN)

( * ) Notice: Subject to any disclaimer, the term of this patent is extended or adjusted under 35 U.S.C. 154(b) by 0 days.

(21) Appl. No.: 17/387,147

(22) Filed: Jul. 28, 2021

(65) Prior Publication Data

US 2022/0362980 A1    Nov. 17, 2022

(51) Int. Cl.
*B29C 45/38* (2006.01)
*B29C 45/17* (2006.01)
*B29C 45/27* (2006.01)
*B29C 45/40* (2006.01)

(52) U.S. Cl.
CPC .......... *B29C 45/38* (2013.01); *B29C 45/1759* (2013.01); *B29C 45/27* (2013.01); *B29C 45/2708* (2013.01); *B29C 45/2711* (2013.01); *B29C 45/4005* (2013.01); *B29C 2045/2716* (2013.01); *B29C 2045/384* (2013.01); *B29C 2045/388* (2013.01); *Y10S 425/051* (2013.01)

(58) Field of Classification Search
CPC ............. Y10S 425/051; B29C 45/1759; B29C 2045/384; B29C 45/2711
See application file for complete search history.

(56) References Cited

U.S. PATENT DOCUMENTS

| | | | | |
|---|---|---|---|---|
| 3,794,286 A | * | 2/1974 | Jullien-Davin | ......... B29C 45/26 425/444 |
| 4,036,571 A | * | 7/1977 | Geyer | ...................... G03B 9/06 425/572 |
| 4,647,275 A | * | 3/1987 | Lundquist | ............... B29C 45/38 264/161 |
| 2010/0230848 A1 | * | 9/2010 | Miao | ...................... B29C 45/38 264/161 |
| 2022/0063162 A1 | * | 3/2022 | Ho | .......................... B29C 45/38 |

* cited by examiner

*Primary Examiner* — Armand Melendez
(74) *Attorney, Agent, or Firm* — Forsgren Fisher McCalmont DeMarea Tysver LLP; James M. Urzedowski; Daniel A. Tysver

(57) ABSTRACT

An injection mold capable of planing and cutting gates in an inside thereof and a planing and cutting method are provided. The injection mold includes a blade fixed block arranged between a moving mold and a fixed mold. Blades arranged on the blade fixed block and configured for cutting off gate condensed-material. The mold includes ejectors for ejecting out the gate condensed material and the blade fixed block. Runners formed between the blade fixed block and the fixed mold. Cut holes for communicating runners and gates are formed in blades. Ejector holes for penetrating the ejectors are formed in portions of the blade fixed block which correspond to bottoms of runners. The blade fixed block moves relative to the moving mold in a mold opening direction. The moving mold is provided with a limiting mechanism for limiting the blade fixed block after injection molding parts are separated from a cavity.

9 Claims, 9 Drawing Sheets

INJECTION MOLD CAPABLE OF PLANNING AND CUTTING GATES IN INSIDE THEREOF AND PLANNING AND CUTTING METHOD

CROSS REFERENCE TO RELATED APPLICATION

This patent application claims the benefit and priority of Chinese Patent Application No. 202110528534.1 filed on May 14, 2021, the entire content of which is incorporated herein by reference.

BACKGROUND OF THE INVENTION

The present disclosure relates to the technic field of cold cutting in mold, and in particular, to an injection mold capable of planning and cutting gates in an inside thereof and a planing and cutting method.

There are many methods for automatically cutting gates in mold in the field of injection molding production. That is, molten plastic is formed and cooled in the mold, and is cut after being completely solidified in runners in a case where the mold is opened. Most cold cutting solutions in the prior art need additional actions and computer programs to control cutters. The additional actions are actions of hydraulic oil cylinders, air cylinders, or inclined-guide-post lateral sliding mechanisms. There are several cold cutting solutions in the prior art as follows.

The first one is an air cutting method of pulling out a cutter from the bottom of a moving mold. Cutter grooves are formed below gates of the moving mold and are penetrated to the bottom. The cutter is connected to an air cylinder in a mold. Blades are driven to cut off the gates by using controlled compressed air, the stress state of which is similar to that of chiseling. Soft chopping boards need to be padded for chiseling, so it is difficult to be realized in the mold. The cutters can be pulled out only after the mold is opened 20 to 30 mm, so as to prevent the cutters from being damaged. The mold has been opened at this time, so above material channels, there is no downward pressure on the gates, whereas the chiseling is not performed on the chopping board. The cutter often ejects the material channel and a product by a certain distance from a cavity before cutting off the gates, which results in obvious breaking creases at upper half parts of notches. The first defect is that the notches are poor in flatness, and are not uniform and consistent. The second defect is that the cutters are easily damaged. Because the characteristic that the cutters cut the gates relying on the impact of the air cylinder, and a manhole is formed in one side of the material channel in order to make the notch flat, a cutter point has rushed out a guide groove of the cavity to lose the solid support when a transverse component force reaches a peak value during cutting. So, the risk of the cutting edge damage is increased. In addition, the air cylinder generates a force to impact the guide of the core pulling when the core has not been pulled, so the service life of the mold is shortened. The third defect is that the gates are cut as soon as the mold is opened 20 to 30 mm, so the product is bound to stay in the cavity and cannot be taken out of the cavity in a manner of ejecting the runners, thereby adding ejectors or auxiliary ejectors.

The second one is a sawing-cutting method. In this method, a movable material-channel plate is arranged. Its moving direction is perpendicular to a mold opening direction. Power or a side sliding mechanism needs to be added for driving, which is difficult to control and is low in efficiency. The biggest problem is that this cutting mode similar to the punching and the blanking is bound to produce the strong extrusion and the strong friction on gate portions of the cavity. The quality of notches is poor, which will certainly affect the service life of the mold seriously. In addition, the defects of ejecting the product cannot be avoided like those caused by the air cutting method mentioned above, and the added side sliding mechanism occupies the certain space, which further reduces the applicability of the method to different products, and increases the design difficulty of the mold.

The third one is a chopping-cutting method. Cutters are all located above the parting surface when products are cut, which is called the chopping-cutting. An air cylinder sliding-rail and cutters are mounted on the outer side of the mold. The action mechanism is that as follows. After the mold is opened, when the material channel and gates of a product are ejected above the parting surface, the air cylinder pulls out the cutters to cut off the gates, and then the air cylinder returns immediately; the material channel and the gates of the product continue to be ejected; and the product is separated from runners and falls down. This method requires that the product should not be too light. The product has been ejected out of the cavity when an air cutter touches the product, so the reacting force of the cutting can only be an inertial force. The magnitude of the inertial force is only related to the mass. In addition, this method has extremely high requirements on the control precision and the debugging of an injection molding machine, which increases the design difficulty of the mold.

The fourth one is a conventional submarine gate. Runners and a cavity are not communicated with each other on a parting surface. Small taper holes are obliquely formed at the positions, which are close to the cavity, of the runners. Finally, the mold is opened by cutting in a drawing or ejecting manner. The disadvantage is that a broken gate will have the appearance defects of turning white, depression, etc. Meanwhile, large and thin-walled products cannot be formed due to the manner of the point-gate feeding.

BRIEF SUMMARY OF THE INVENTION

The objective of the present disclosure is to provide an injection mold capable of planning-and-cutting gates in an inside thereof and a planning-and-cutting method, so as to solve the problems in the prior art. After injection molding parts are separated from a cavity, a limiting mechanism limits a blade fixed block and blades, and ejectors are penetrated through respective ejector holes and are continually ejected the condensed material. In this way, gates are cut off at respective cut holes, thereby achieving an automatic shearing process of the gates without adding the drive to cutters, which solves the problems that the cutters are easily damaged and notches are prone to occur breaking creases in the prior art.

In order to achieve the above-mentioned objective, the present disclosure provides the solutions as follows. The present disclosure provides an injection mold capable of planing and cutting gates in an inside thereof. The injection mold includes: a blade fixed block arranged between a moving mold and a fixed mold; blades arranged on the blade fixed block and configured for cutting off gate condensed-material; and ejectors configured for ejecting out the gate condensed material and the blade fixed block, wherein runners are formed between the blade fixed block and the fixed mold; cut holes configured for communicating the runners and the gates are formed in the blades; ejector holes configured for penetrating the ejectors are formed in portions of the blade fixed block which are corresponding to bottoms of the runners; the blade fixed block moves relative to the moving mold in a mold opening direction; and the moving mold is provided with a limiting mechanism configured for limiting the blade fixed block after injection molding parts are separated from a cavity of the moving mold.

In some embodiments, edges of the cut holes which are close to the fixed mold are opened with respective cutting edges; other edges of the cut holes which are close to the moving mold are opened with respective force transferring slopes; and each of the force transferring slopes is of an inclined structure and faces toward a corresponding one of the runners.

In some embodiments, a side wall of each of the ejector holes which is away from a corresponding one of the blades is provided with a discharging slope; and the discharging slope is parallel to an inclined surface of a corresponding one of the cutting edges.

In some embodiments, a starting position of an end surface of each of the ejectors is flush with a slope starting point, which is away from the fixed mold, of a corresponding one of the force transferring slopes.

In some embodiments, each of the ejectors is tightly close to a corresponding one of the blades in a direction perpendicular to the mold opening direction.

In some embodiments, sides of corresponding portions of the blades which are close to the cavity are of planar structures, wherein the corresponding portions are corresponding to the cut holes; and the planar structures are parallel to the mold opening direction.

In some embodiments, a gate channel is communicated between each of the cut holes and the cavity; a width of a cross section of the gate channel is greater than a width of a cross section of the cut hole; and a ring of the gate channel is sleeved on side walls of the cut hole.

In some embodiments, each of the blades extends out of a parting surface between the blade fixed block and the fixed mold in the mold opening direction, and a length of the blade extending out of the parting surface is greater than a width of a cross section of the gate.

In some embodiments, a part of each of the blades which is extending out of the parting surface is inserted into a narrow groove formed in the fixed mold; and the blade is in close running fit with the narrow groove.

The present disclosure further provides a planing and cutting method carried out by the injection mold capable of planing and cutting gates in an inside thereof. The method includes the following steps as follows. Open and ejection of the injection mold: separating the moving mold from the fixed mold after the injection mold is opened; and pushing runner condensed material and the blade fixed block by the ejectors to move in a direction away from the moving mold, such that the injection molding parts are separated from the cavity of the moving mold. Limiting action: enabling pull-rod guide posts to reach a limiting position to limit the blade fixed block and the blades to continually move, after the injection molding parts are separated from the cavity of the moving mold. Gates cutting: moving the ejectors forwards continually, and pressing the gate condensed material against the cutting edges to yield the gate condensed material, after the blade fixed block and the blades stop moving, such that the runner condensed material is cut off by the cutting edges, and the injection molding parts are separated from the runner condensed material. Ejection of remaining material: ejecting out via the ejectors continually after the injection molding parts are separated from the runner condensed material, so as to enable the runner condensed material to completely separate from the blade fixed block and the blades.

Compared with the prior art, the present disclosure achieves the technical effects as follows.

First, the cut holes configured for communicating the runners and the gates are formed in the blades; the ejector holes configured for penetrating the ejectors are formed in the positions of the blade fixed block which are corresponding to the bottoms of the runners. The blade fixed block moves relative to the moving mold in the mold opening direction. The moving mold is provided with the limiting mechanism configured for limiting the blade fixed block after injection molding parts are separated from a cavity. After the injection molding parts are separated from the cavity, the limiting mechanism limits the blade fixed block and the blades, the ejectors penetrate through the respective ejector holes to continually eject out the condensed material, and the gates are cut off at the respective cut holes, thereby achieving an automatic shearing process of the gates without adding drive to cutters, which solves the problems that the cutters are easily damaged and notches are prone to occur the breaking creases in the prior art.

Second, the cutting edge is formed on the edge of each of the cut holes which is close to the fixed mold; the force transferring slope is formed on the other edge of each of the cut holes which is close to the moving mold; and the force transferring slope is of an inclined structure and faces toward the runner. After molten material is condensed at the cut holes, the slope with the gradient of which is matched with that of the force transferring slope is formed at the position corresponding to the force transferring slope. When the ejectors push the condensed material at the cut holes, the acting forces of the ejectors applied to the condensed material are obliquely transferred to the cutting edges above the gates, along the slopes that are formed by the condensed material and are corresponding to the force transferring slopes. In this way, the thrust and the cutting edge are close to the same straight line as possible, thereby achieving an ideal cutting effect, and meanwhile, reducing the lateral component force undergone by the blade.

Third, a side wall of each of the ejector holes which is away from a corresponding one of the blades is provided with a discharging slope; and the discharging slope is parallel to an inclined surface of a corresponding one of the cutting edges. When the gates are yielded at the cutting edge, the inclined surfaces of the cutting edges produce each an instantaneous extrusion force on the respective runner condensed material. One side, which is close to the runner, of the runner condensed material at the cut hole is extruded to generate plastic deformation backwards. At this time, if there is a straight hole above the end surface of the ejector, the condensed material in this section of the runner above the end surface of the ejector will be strongly extruded due to a wedging action of the cutting edge, and its reacting force may even crack the blade. So, the discharging slopes are formed to unload abnormal lateral pressure undergone by the blades, thereby cutting off the gates lightly and quickly, and prolonging the service lives of the blades.

Fourth, the gate channel is communicated between the cut hole and the cavity; the width of the cross section of the gate channel is greater than that of the cross section of the cut hole; a ring of the gate channel is sleeved on side walls of the cut hole. During cutting off the gates, the runner condensed material is strongly extruded due to the wedging action of the cutting edge, and the condensed material at the gate channel is dragged in the direction away from the cavity. The width of the cross section of the gate channel is greater than that of the cross section of the cut hole, and the ring of the gate channel is sleeved on the side walls of the cut hole. In this way, the part, which is corresponding to the cut hole, of the condensed material in the gate channel is dragged, and thus another part, which is not corresponding to the cut hole, of the condensed material in the gate channel can tightly press against the surface of the blade which is close to the cavity, thereby preventing the condensed material in the gate channel from being cut off after being dragged and deformed integrally, which results in the uneven cross section, and affects the surface quality of a workpiece.

Fifth, a part of the blade which is extending out of the parting surface is inserted into a narrow groove formed in the fixed mold; and the blade is in close running fit with the narrow groove. That is, the blade can be separated from the fixed mold when the mold is opened, and can also be in close fit with the fixed mold when the mold is closed. So, the runners and the cavity are just separated on the two sides of each of the blades by the blades when the mold is closed. Furthermore, the distance between each of the blades and the cavity, i.e., the thickness of a remaining gate of the injection molding part, is determined according to the appearance requirement of the product, which is usually 0.5 to 1 mm, and can also be zero. When the thickness is zero, the surfaces of the blades directly and partially replace the cavity, and directly cut without remaining gates, which ensures the surface quality of the workpiece.

DETAILED DESCRIPTION OF THE INVENTION

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the protection scope of the present disclosure.

The present disclosure is used for overcoming the defects in the above-mentioned prior art, and provides an injection mold capable of planing and cutting gates in an inside thereof and a planing and cutting method, so as to solve the problems in the prior art. After an injection molding parts are separated from a cavity, a limiting mechanism limits a blade fixed block and blades; ejectors penetrate through respective ejector holes to continually eject out a condensed material, thereby cutting off gates at cut holes. In this way, the automatic shearing process of the gates is achieved without adding drive to cutters, which solves the problems that the cutters are easily damaged and the notches are prone to occur the breaking creases in the prior art.

In order to make the above objective, features, and advantages of the present disclosure more apparent and more comprehensible, the present disclosure is further described in detail below with reference to the accompanying drawings and specific implementation manners.

Figure 1:
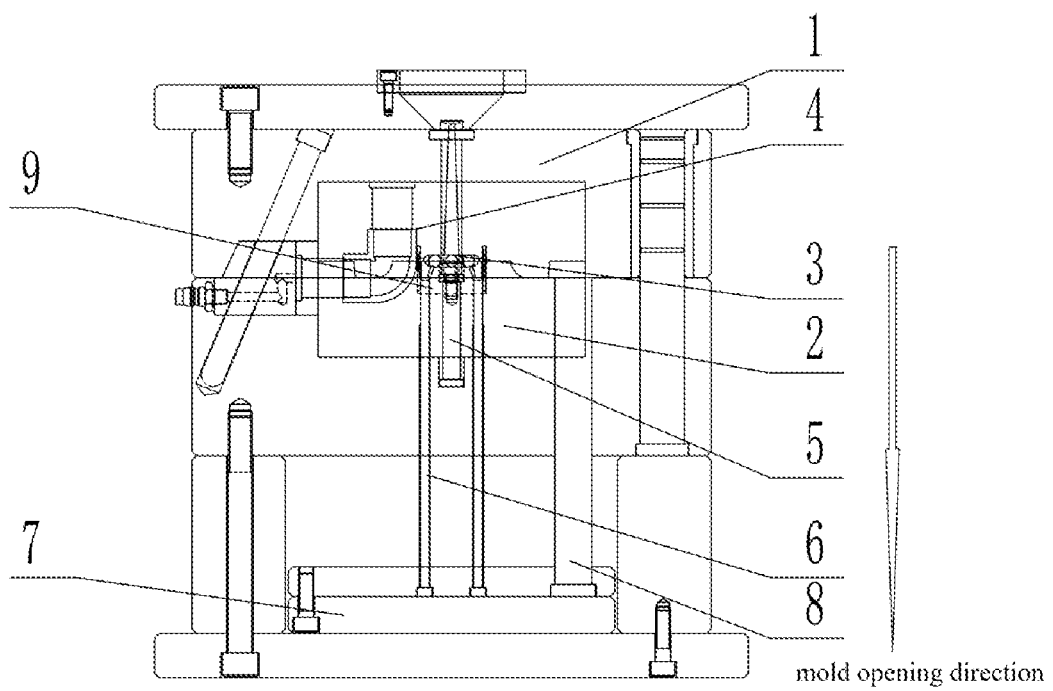
FIG. 1 is a front view of an overall structure according to an embodiment of the present disclosure.
Figure 2:
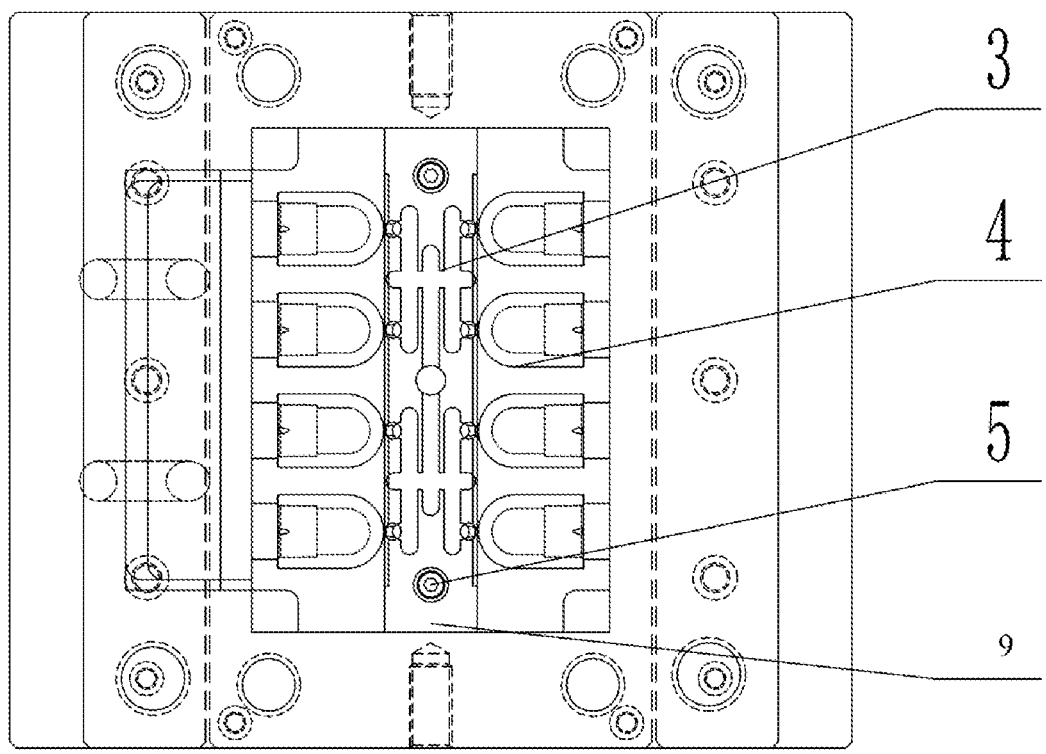
FIG. 2 is a side view of the overall structure according to an embodiment of the present disclosure.
Figure 3:
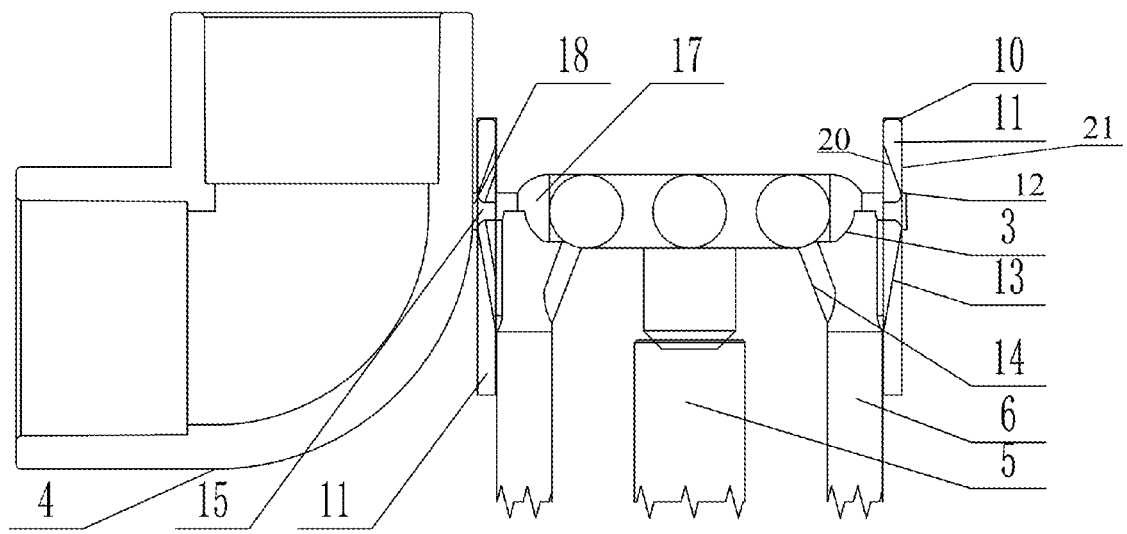
FIG. 3 is an enlarged view of a blade fixed block in FIG. 1.
Figure 4:
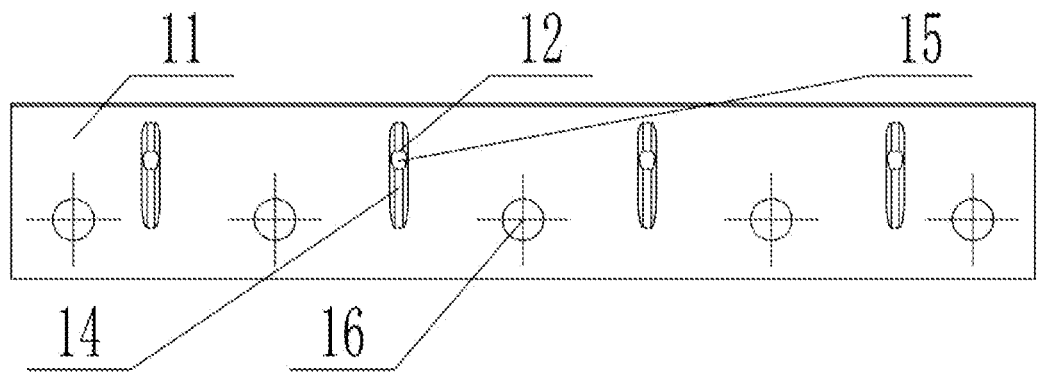
FIG. 4 is a front view of a blade according to an embodiment of the present disclosure.
Figure 5:
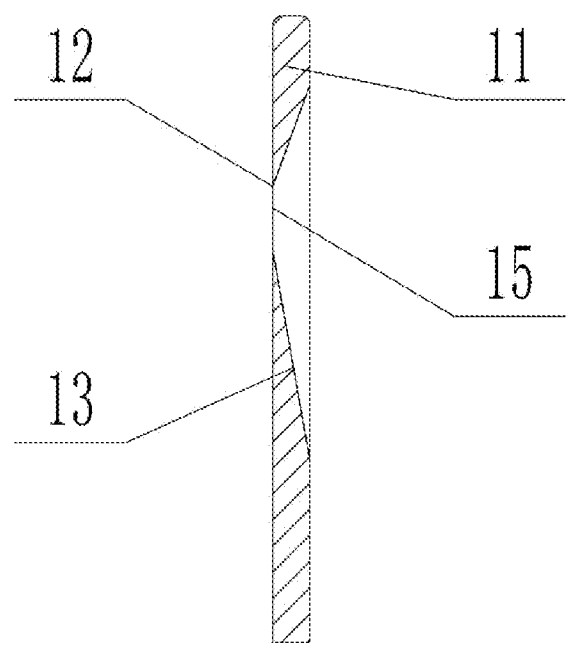
FIG. 5 is a sectional view of a cut hole of the blade according to an embodiment of the present disclosure.
Figure 6:
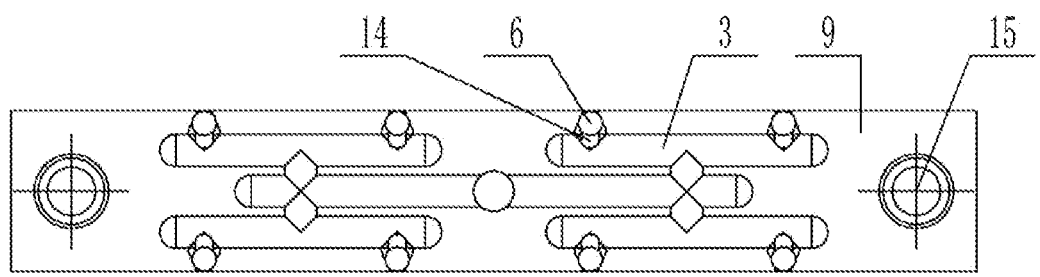
FIG. 6 is a vertical view of the blade fixed block according to an embodiment of the present disclosure.
Figure 7:
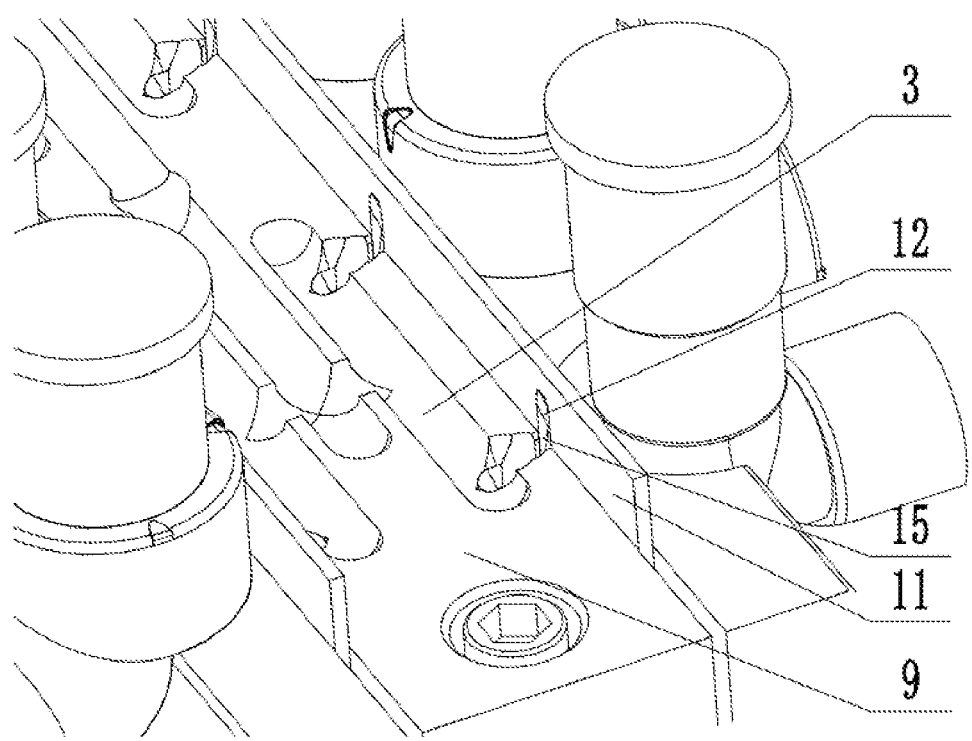
FIG. 7 is a schematic structural diagram of a connection between the blade fixed block and a blades according to an embodiment of the present disclosure.
Figure 8:
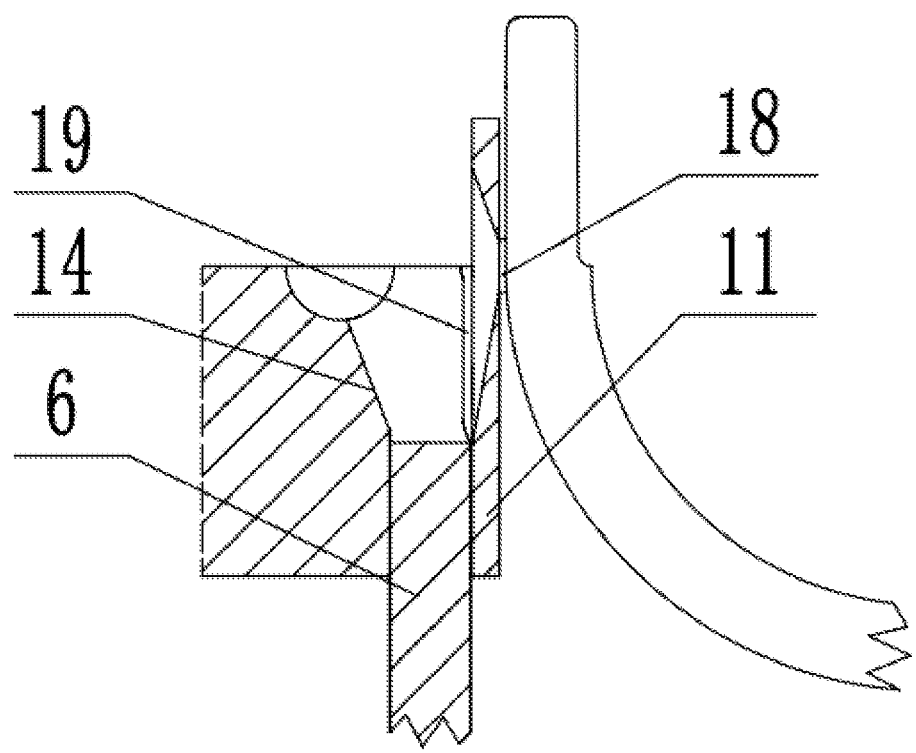
FIG. 8 is a sectional view of a connection between the blade fixed block and the blades according to an embodiment of the present disclosure.
Figure 9:
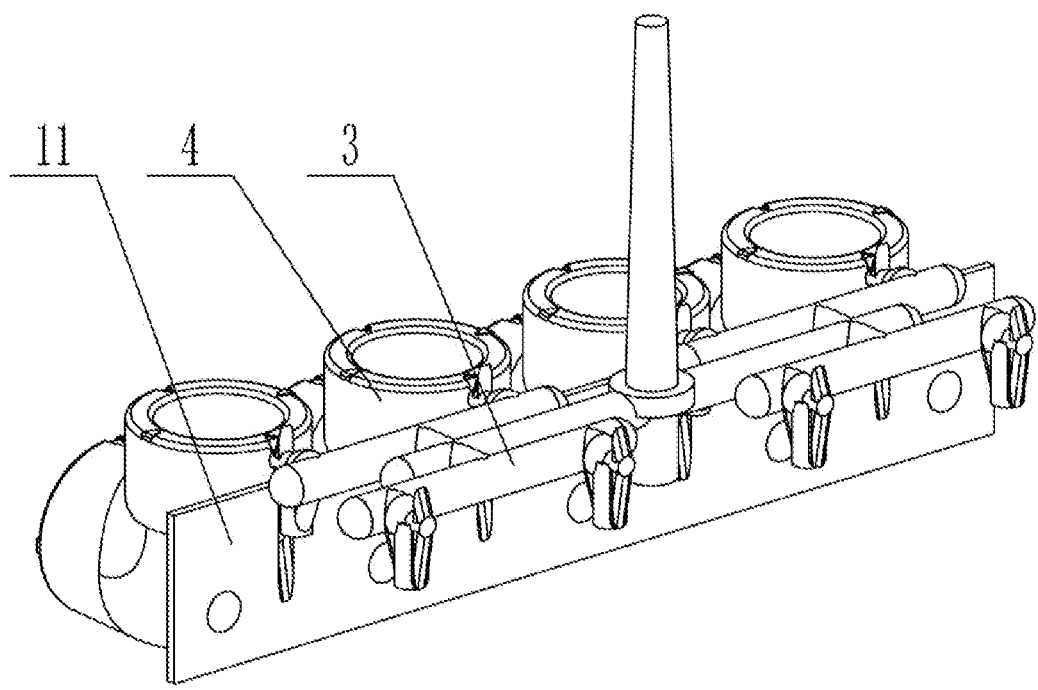
FIG. 9 is a perspective diagram showing a structure that a blade is connected with runners and injection molding parts according to an embodiment of the present disclosure.

As shown in FIG. 1 to FIG. 9, the present disclosure provides an injection mold capable of planing and cutting gates in an inside thereof, including: a blade fixed block 9 arranged between a moving mold 2 and a fixed mold 1, blades 11 arranged on the blade fixed block 9 and configured for cutting off gate condensed material 18; and ejectors 6 configured for ejecting out the condensed material and the blade fixed block 9. Runners 3 are formed between the blade fixed block 9 and the fixed mold 1. After the mold is opened, the blade fixed block 9 is separated from the fixed mold 1, and the runner condensed material 17 is remained on the blade fixed block 9. Cut holes 15 configured for communicating the runners 3 and the gates are formed in the blade 11. Fixing holes 16 are formed in the blade 11. The blade 11 is detachably connected to the blade fixed block 9 through the structures, such as bolts, so as to facilitate the replacement of various types of blades 11 and the like. The cut holes 15 may be in a variety of shapes, for example, a circular hole or a square hole, so as to enable the molten material to penetrate through the cut holes 15 and to be injected into a cavity. Ejector holes configured for penetrating the ejectors 6 are formed in the portions, which are corresponding to the bottoms of the runners 3, of the blade fixed block 9. The blade fixed block 9 moves relative to the moving mold 2 in a mold opening direction. A limiting mechanism 5 is arranged on the moving mold 2, and configured for limiting the blade fixed block 9 after injection molding parts 4 are separated from the cavity. Specifically, the limiting mechanism 5 is a sliding rod, a transmission screw, or the like, which connects the blade fixed block 9 to the moving mold 2 and slides in the direction far away from the moving mold 2 along with the opening of the mold. After the injection molding parts 4 are separated from the cavity, the sliding rods or the transmission screws stop acting to limit the blade fixed block 9.

In some embodiments, in order to ensure the balance control of the blade fixed block 9 and ensure the moving effect of the blade fixed block 9, the limiting mechanism 5 includes a plurality of pull-rod guide posts, and various pull-rod guide posts are uniformly connected to the blade fixed block 9. As a preferred implementation manner of the present disclosure, the pull-rod guide posts are detachably connected to the blade fixed block 9 through bolt structures. The bolt structures extend out of one side of the blade fixed block 9 which is close to the fixed mold, i.e., the side that faces toward a parting surface. And then the blade fixed block 9 is directly detached through the bolt structures on the parting surface side after the mold is opened, when the cutters need to be replaced. In this way, the quick, simple, and convenient replacement of the blade is ensured.

After the injection molding is completed and the mold is opened, when the ejecting is started, each ejector 6 pushes the runner condensed material and the blade fixed block 9 to move outwards together. After a product is brought away from the cavity of the moving mold 2, the blade fixed block 9 is pulled immovably by the pull-rod guide posts. The ejector 6 continues ejecting to drive the runner condensed material 17 to continue moving forwards, so that the runner condensed material 17 is cut off by the blades 11 that have been pulled immovably by the pull-rod guide posts at this time. In this way, the automatic demolding and the automatic gate shearing processes are completed without adding the drive to the cutters, which solves the problems that the cutters are easily damaged and notches are prone to occur the breaking creases in the prior art. Specifically, for the configuration of an original common side gate mold, when arranging the blade fixed block 9, the runner portions of the moving mold are hollowed, and then the blade fixed block 9 is arranged at the above-mentioned hollowed portions, which is even very suitable for the configuration of an old mold without the additional power. For example, the power is supplied by an air cylinder or an oil cylinder in the prior art. So, the space in the mold can be fully saved without the additional control, and the overall configuration or processing process is simpler and easier to implement.

As a preferred implementation manner of the present disclosure, in a mold with multi-cavity structures, multiple runners 3 are arranged and are connected to respective mold cavities. Specifically, outlets 19 of a plurality of the runners 3 are uniformly distributed in the circumferential direction of the blade fixed block 9. The outlets 19 of the various runners 3 are correspondingly communicated with cut holes 15 that are configured for cutting off the runner condensed material 17, which is applied to a the mold with multi-cavities to simultaneously cut the runner condensed material 17.

Further, a cutting edge 12 is formed on the edge, which is close to the fixed mold 1, of the cut hole 15. The angle of an inclined surface 20 of the cutting edge 12 can be adjusted according to the requirements of different plastic materials and products. In some embodiments, the universal angle of the cutting edge 12 is generally 20°, so as to facilitate the manufacturing of a standard piece. A force transferring slope 13 is formed on the edge, which is close to the moving mold 2, of the cut hole 15. The force transferring slope 13 is of an inclined structure and faces toward the runner 3. The angle of the force transferring slope 13 can be adjusted according to the requirements of different plastic material and products. In some embodiments, the force transferring slope 13 is matched with the cutting edge 12 with the 20° angle, and the universal angle is generally 10°. The relative movement between the cutting edge 12 and the ejector 6 just form a set of shearing moment, i.e., a pair of scissors configured for cutting off the gate condensed material 18.

According to a shear principle, the two external forces must be in opposite directions, and the distance between the two shearing moments infinitely approaches 0, rather than not equal to 0. So, the force transferring slope 13 is arranged, and a slope matched with the gradient of the force transferring slope 13 is formed at the position corresponding to the force transferring slope 13. Furthermore, after the molten material is condensed at the cut holes 15, the acting force applied to the condensed material by the ejectors 6 is obliquely transferred to the cutting edges 12 above the gates, along the slopes that are formed by the condensed material and are corresponding to the force transferring slopes 13, when the ejector 6 pushes the condensed material at the cut holes 15. In this way, a thrust and the cutting edge are close to the same straight line as possible, thereby achieving an ideal cutting effect, and meanwhile, reducing the lateral component force undergone by the blade 11. In order to further ensure the cutting effect, the specific cutting edge 12 is a single slope. Furthermore, the single slopes of both the force transferring slope 13 and the cutting edge 12 are located on one side, which is away from the cavity, of the blade 11. And a tip end, which is close to the cutting edge 12, of the force transferring slope 13, and the cutting edge line of the cutting edge 12 are directly arranged, which further ensures that the thrust and the cutting edge are close to the same straight line.

As a preferred implementation manner of the present disclosure, the cut hole 15 is of a square hole structure. The extending direction of the cutting edge 12 is perpendicular to the mold opening direction. Then, first, the formed cutting edge 12 is of a straight plate-shaped structure. Compared with an arc-shaped cutting edge, the contact area between the straight plate-shaped cutting edge 12 and the gate condensed material 18 is smaller, which ensures the enough cutting intensity of pressure under the acting forces of the ejectors 6. Second, the straight plate-shaped structure has a constant gradient compared with the arc-shaped cutting edge, which avoids generating an extrusion force towards the inner side of the arc-shaped cutting edge when the condensed material is cut off by the arc-shaped cutting edge. So, the shape of the gate condensed material 18 is affected during cutting, and the cutting effect of the gate condensed material 18 is further affected. Third, the straight plate-shaped structure can apply a constant cutting force to the gate condensed material 18 compared with the arc-shaped cutting edge, which ensures a cutting effect on the gate condensed material 18. In some embodiments, the corners of the two sides of both the cutting edge 12 and the force transferring slope 13 are rounded, to prevent stress concentration and affecting the strength of the cutter.

Further, a discharging slope 14 is formed on a side wall, which is away from the blade 11, of the ejector hole. Specifically, the discharging slope 14 is a part of the inner side wall of the runner 3. The discharging slope 14 is parallel to the inclined surface 20 of the cutting edge 12. When the gate is yielded at the cutting edge 12, the inclined surface 20 of the cutting edge 12 produces an instantaneous extrusion force on the runner condensed material 3. One side, which is close to the runner 3, of the runner condensed material 17 at the cut hole 15 is extruded to generate plastic deformation backwards. At this time, if there is a straight hole above the end surface of the ejector 6, the condensed material 17 in this section of the runner above the end surface of the ejector 6 will be strongly extruded due to a wedging action of the cutting edge 12, and its reacting force may even crack the blade 11. So the discharging slope 14 is formed to unload the abnormal lateral pressure undergone by the blade 11, thereby cutting off the gate lightly and quickly, and prolonging the service life of the blade 11. In some embodiments, in order to further unload the abnormal lateral pressure undergone by the blade 11, the discharging slope 14 is of an unclosed conical structure. The gradient of the conical surface of the conical structure is equal to the gradient of the inclined surface 20 of the cutting edge 12, so as to increase the contact area between the conical structure and the runner condensed material 17, thereby reducing the intensity of pressure of the runner condensed material in 17.

Further, the starting position of the end surface of the ejector 6 is flush with the slope starting point, which is away from the fixed mold 1, of the force transferring slope 13, which has the function that the ejector 6 can directly push the runner condensed material 17 to extrude the cutting edge 12. So, the runner condensed material 17 is cut off by being yielded under the pressure. In addition, the thrust applied to the runner condensed material 17 by the ejector 6 is directly transferred along the slope, which is corresponding to the force transferring slope 13, of the runner condensed material 17, which ensures a planing and cutting effect.

Further, the ejector 6 is close to the blade 11 in the direction perpendicular to the mold opening direction. For example, a gap of only 0.05 to 0.1 mm is reserved between the ejector 6 and the blade 11. The ejector 6 is close to the blade 11 with the maximum extent, so as to reduce the overturning moment of the runner condensed material 17 as possible. The overturning moment is mainly produced because there is a gap between one side, which is close to the cavity, of the end surface of the ejector 6 and the cutting edge line of the cutting edge 12 in the direction perpendicular to the mold opening direction. The gap is inevitable to ensure the sliding of the ejector 6, so the gap between the one side, which is close to the cavity, of the end surface of the ejector 6 and the cutting edge line can be ensured by reducing the gap between the ejector 6 and the blade 11 as possible. In this way, the overturning moment of the runner condensed material in 17 is reduced as possible, thereby ensuring the cutting off effect on the runner condensed material 17.

Further, the blades 11 each have respective corresponding portions 21 corresponding to the cut holes. One side, which is close to the cavity, of the portion of the blade 11 which is corresponding to the cut hole 15 is of a planar structure. The planar structure is parallel to the mold opening direction, which is beneficial to the flatness of the notch in one side of the product, and ensures the surface quality of the injection molding part 4. One side, which is close to the cavity, of the blade 11 is of the planar structure, and the cutting edge line of the cutting edge 12 and the planar structure are positioned on the same plane during manufacturing. That is, the cutting edge 12 is of a single slope structure, so that the cutting edge is formed in one side, which is close to the product, of the blade 11, and the notch is flat and not too long. Two rigid bodies that are the blade 11 and the ejector 6 cannot collide face to face, so the ejector 6 can only be formed on one side, which is away from the cavity, of the blade 11. The cutting force of the blade 11 and the thrust of the ejector 6 are staggered by at least one thickness of the blade 11, which affects the planing and cutting effect. To achieve the planing and cutting, the condensed material can only meet the condition required for shearing, by transferring the thrust, which has a small included angle, of the ejector 6 to one side of the cutting edge of the blade 11, relying on the condensed material's rigidity. The force transferring slope 13 is arranged opposite to the cutting edge 12, so that a corresponding slope structure is formed at the position, which is corresponding to the force transferring slope 13, of the runner condensed material 17, so that the thrust of the ejector 6 is transferred in the direction obliquely facing the cutting edge 12.

The specific stress analysis of the force transferring slope is as follows. This mechanism is regarded as a woodworking Luban planer that is vertically inverted. The horizontal thrust required for the planing and cutting is the reacting force of an ejecting force of the ejector 6 acting on the cutting edge through the runner condensed material in. The ejector 6 pushes the condensed material upward and is obliquely blocked by the slope of the cutting edge above. An oblique downward pressure F1 perpendicular to the slope of the cutting edge is then generated. The resultant force of two external forces, namely, a vertical upward ejecting force F2 and the oblique downward pressure F1, forms an oblique upward force F3. The magnitude of the acting force is equal to that of the reacting force, according to the parallelogram rule of force. In this case, the resultant force of the ejecting force F2 and the downward pressure F1 is an upward force that is obliquely upward in the direction from the blade to the ejector 6 and forms an included angle with the plane. A horizontal component force which acts in the direction from the blade to one side of the runner is decomposed, so as to generate the trend of dragging the product to the runner during the planing and cutting, which is equivalent to the downward pressure that must be applied in the use of the woodworking Luban planer. So, the planing and cutting depth is deepened gradually toward one side of the product, which is not beneficial to the flatness of the notch. At this time, the function of the force transferring slope 13 is shown. Stress is generated inside the condensed material due to dual actions of the ejecting force F2 of the ejector 6 and the downward pressure F1 of the slope of the cutting edge. The essence is that an intermolecular force is distinguished from the intensity of pressure in that the magnitude of stress per unit area, and the intermolecular force and the intensity of pressure have the same expression, which can be understood as a process similar to the energy storage of a polyurethane spring to some extent. The part, which is corresponding to the force transferring slope, of the condensed material is formed into a slope with the same gradient as the force transferring slope. The rebounding force of the condensed material is obliquely upward toward the injection molding part along the slope. The vertical component force of the rebounding force is equivalent to give the rigidity to the cutting edge, which can continuously support the planning-and-cutting progress. The horizontal component force of the rebounding force can balance the horizontal dragging force produced on the injection molding part by the runner condensed material, due to external resultant force during the planing and cutting as possible, which is also equivalent to a supporting force of the wood to the planer during the woodworking planing and cutting. So, a further enlargement of the planing and cutting can be limited, so that the planing and cutting is easy and the surface is flat.

Further, the gate channel is communicated between the cut hole 15 and the cavity. The length of the gate channel needs to be determined according to the appearance requirement of the product, and is generally 0.5 to 1 mm. The specific gate channel is formed in the outer wall of the cavity. The blade 11 directly seals the outer side of the gate channel to partially replace the cavity and avoid the remaining gate. The width of the cross section of the gate channel is greater than that of the cross section of the cut hole 15. A ring of the gate channel is sleeved on the side walls of the cut hole 15. During cutting off the gates, the runner condensed material is strongly extruded due to the wedging action of the cutting edge 12, and the condensed material at the gate channel is dragged in the direction away from the cavity. The width of the cross section of the gate channel is greater than that of the cross section of the cut hole 15, and the ring of the gate channel is sleeved on the side walls of the cut hole 15, so the part, which is not corresponding to the cut hole 15, of the periphery of the condensed material can tightly press against the surface, which is close to the cavity, of the blade 11, during dragging the part, which is corresponding to the cut hole 15, of the condensed material in the gate channel. So, the condensed material in runners 3 of the gate is prevented from being cut off after being dragged and deformed integrally, thereby resulting in the uneven cross section, and affecting the surface quality of a workpiece.

Further, the blade 11 extends out of a parting surface between the blade fixed block 9 and the fixed mold 1 in the mold opening direction, and the length of the blade 11 extending out of the parting surface is greater than the width of the cross section of the gate. Specifically, the length of the blade 11 extending out of the parting surface is about twice the thickness of the gate. For example, the thickness of the gate is 4 mm, the length of the blade 11 extending out of the parting surface is at least 8 mm to ensure the strength of the blade 11, and avoid the brittle fracture of blade 11 caused by the relatively thick gate.

Further, the part, which is extending out of the parting surface, of the blade 11 is inserted into the narrow groove 10 formed in the fixed mold 1. The blade 11 is in close running fit with the narrow groove 10, i.e., the blade can be separated from the fixed mold 1 when the mold is opened, and can also be in close fit with the fixed mold 1 when the mold is closed. So, the runner 3 and the cavity are just separated on the two sides of the blade 11 by the blade 11 when the mold is closed. Then, the distance between the blade and the cavity is the thickness of a remaining gate of the injection molding part, which is determined according to the appearance requirement of the product. The distance is usually 0.5 to 1 mm, and can also be zero. When the thickness is zero, the surface of the blade directly replaces partially the cavity, and the gate is directly cut without residues, which ensures the surface quality of the workpiece. In some embodiments, the fit gap between the blade 11 and the narrow groove 10 needs to float up and down according to the fluidity of the used plastics. The fit gap between the blade 11 and the narrow groove 10 should be reduced appropriately for the injection molding of the plastics with the good fluidity. On the contrary, the fit gap can be widened appropriately. The corner of the end surface, which is inserted into the narrow groove 10, of the blade 11 should be chamfered to be used as a guide, for example, a chamfer with R0.5, so as to prevent the blade 11 from scratching the cavity when the blade 11 is staggered slightly.

The present disclosure further provides a planing and cutting method carried out by an injection mold capable of planing and cutting gates in an inside thereof, including the steps as follows.

Open and ejection of the injection mold: the moving mold 2 is separated from the fixed mold 1 after the injection mold is opened; an ejector rod 6 pushes the runner condensed material 17 and a blade fixing block 9 to move in the direction away from the moving mold 2. And an injection molding part 4 is separated from a cavity of the moving mold 2. Specifically, after the mold is opened, usually, the product is left in the moving mold 2 and only needs an ejection action. The present process is the same. When the ejection starts, a pushing plate 7 pushes the ejector 6, and the ejector 6 pushes the runner condensed material 17 to eject the cutting edge 12. The blade fixing block 9 has a freedom degree at the beginning, a system friction force cannot reach the yield strength value of the cutting edge 12, cutting into the runner condensed material 17. So the ejector 6 drives the runner condensed material 17 and the product to be separated from the cavity together. That is, the product is taken down by only ejecting the runner instead of ejecting the product. In order to separate the product from the cavity, the product is cut off and out of the parting surface. The demolding of the product is completed while performing the ejection one time. Each gate is cut off and falls down, which prevents a mold pressing accident caused by the fact that a product or a runner is hanging on the mold.

Limiting action: pull-rod guide posts is enabled to reach a limiting position to limit the blade fixed block 9 and the blades 11 to continually move, after the injection molding parts 4 are separated from the cavity of the moving mold 2.

Gates cutting: the ejectors 6 are moved forwards continually, and the gate condensed material 18 is pressed against the cutting edges 12 to yield the gate condensed material 18, after the blade fixed block 9 and the blades 11 stop moving, such that the runner condensed material 17 is cut off by the cutting edges 12, and the injection molding parts 4 are separated from the runner condensed material 17. Specifically, after the molten material is condensed at the cut hole 15, a slope with the gradient matched with that of the force transferring slope 13 is formed at the position corresponding to the force transferring slope 13. And when the ejector 6 pushes the condensed material at the cut hole 15, the acting force of the ejector applied to the condensed material is obliquely upwards transferred to the cutting edge 12 above the gate, along the slope formed by the condensed material corresponding to the force transferring slope 13. In this way, the thrust and the cutting edge are close to the same straight line as possible, thereby achieving an ideal cutting effect, and meanwhile, reducing the lateral component force undergone by the cutter blade 11.

Ejection of remaining material: the ejectors 6 continually eject out after the injection molding parts 4 are separated from the runner condensed material 17, so as to enable the runner condensed material 17 to completely separate from the blade fixed block 9 and the blades 11. A returning rod 8 pushes the moving mold 2 and the fixed mold 1 to close and reset, so as to complete an injection molding period and enter the next cycle.

All adaptive changes made according to actual demands are within the protection scope of the disclosure.

In the present disclosure, specific examples are applied to illustrate the principle and implementation manner of the present disclosure. The description of the above embodiment is only used to help understand the method and core idea of the present disclosure. Meanwhile, for those of ordinary skill in the art, there will be changes in the specific implementation manner and scope of application according to the idea of the present disclosure. In conclusion, the content of the present description shall not be construed as a limitation to the present disclosure.

What is claimed is:

1. An injection mold capable of planing and cutting gates in an inside thereof, the injection mold comprising:
   a blade fixed block arranged between a moving mold and a fixed mold;
   blades arranged on the blade fixed block and configured for cutting off gate condensed material; and
   ejectors configured for ejecting the gate condensed material and the blade fixed block out of the moving mold, wherein runners are formed between the blade fixed block and the fixed mold; cut holes configured for communicating the runners and the gates are formed in the blades; ejector holes configured for penetrating the ejectors are formed in portions of the blade fixed block which are corresponding to bottoms of the runners; the blade fixed block moves relative to the moving mold in a mold opening direction; and the moving mold is provided with a limiting mechanism configured to limit a position of the blade fixed block after each of injection molding parts is separated from a corresponding one of cavities of the moving mold, the limiting mechanism includes a plurality of pull-rod guide posts, and the pull-rod guide posts are uniformly connected to the blade fixed block; each of the ejectors is configured to push runner condensed material and the blade fixed block to move outwards together after injection molding is completed and the injection mold is opened, when ejecting is started; the blade fixed block is configured to be pulled immovably by the pull-rod guide posts, after a product is brought away from a corresponding one of cavities of the moving mold; each of the ejectors is able to continue ejecting to drive the runner condensed material to continue moving forwards, so that the runner condensed material is cut off by the blades that have been pulled immovably by the pull-rod guide posts;

wherein first edges of the cut holes which are each away to a top end of a corresponding one of the ejectors are connected to respective cutting edges; second edges which are each opposite to the first edges of the cut holes are connected to respective force transferring slopes, wherein the first edges are top edges relative to the ejectors and the second edges are bottom edges relative to the ejectors; and each of the force transferring slopes is of an inclined structure and faces toward a corresponding one of the runners; an inclined surface of a corresponding one of the cutting edges faces toward the corresponding one of the runners.

2. The injection mold according to claim 1, wherein a side wall of each of the ejector holes which is away from a corresponding one of the blades is provided with a discharging slope; and the discharging slope is parallel to the inclined surface of the corresponding one of the cutting edges.

3. The injection mold according to claim 1, wherein a starting position of an end surface of each of the ejectors is flush with a slope starting point, which is away from the fixed mold, of a corresponding one of the force transferring slopes.

4. The injection mold according to claim 2, wherein a starting position of an end surface of each of the ejectors is flush with a slope starting point, which is away from the fixed mold, of a corresponding one of the force transferring slopes.

5. The injection mold according to claim 3, wherein each of the ejectors is attached to a corresponding one of the blades in a direction perpendicular to the mold opening direction.

6. The injection mold according to claim 4, wherein each of the ejectors is attached to a corresponding one of the blades in a direction perpendicular to the mold opening direction.

7. The injection mold according to claim 2, wherein the blades each have respective corresponding portions corresponding to the cut holes, sides of the corresponding portions of each of the blades which are opposite to the runners are of planar structures, and the planar structures are parallel to the mold opening direction.

8. The injection mold according to claim 1, wherein each of the blades extends out of a parting surface between the blade fixed block and the fixed mold in the mold opening direction, and a length of the blade extending out of the parting surface is greater than a width of a cross section of the gate.

9. The injection mold according to claim 8, wherein a part of each of the blades which is extending out of the parting surface is inserted into a narrow groove formed in the fixed mold; and the blade is in moveable fit with the narrow groove.

* * * * *